(12) United States Patent
Henry

(10) Patent No.: US 10,696,583 B2
(45) Date of Patent: Jun. 30, 2020

(54) COMPOSITION FOR STRENGTHENING GLASS

(75) Inventor: James Jackson Milham Henry, Houston, TX (US)

(73) Assignee: C-Bond Systems, LLC, Houston, TX (US)

( * ) Notice: Subject to any disclaimer, the term of this patent is extended or adjusted under 35 U.S.C. 154(b) by 0 days.

(21) Appl. No.: 14/128,620

(22) PCT Filed: Jul. 9, 2012

(86) PCT No.: PCT/US2012/045936
§ 371 (c)(1),
(2), (4) Date: Dec. 22, 2013

(87) PCT Pub. No.: WO2013/009691
PCT Pub. Date: Jan. 17, 2013

(65) Prior Publication Data
US 2014/0141260 A1    May 22, 2014

Related U.S. Application Data

(60) Provisional application No. 61/505,860, filed on Jul. 8, 2011.

(51) Int. Cl.
*C03C 17/30* (2006.01)
*B05D 1/02* (2006.01)

(52) U.S. Cl.
CPC ........... *C03C 17/30* (2013.01); *B05D 1/02* (2013.01); *Y10T 428/31612* (2015.04)

(58) Field of Classification Search
CPC .... B05D 1/02; C03C 17/30; Y10T 428/31612
See application file for complete search history.

(56) References Cited

U.S. PATENT DOCUMENTS

| | | | | | |
|---|---|---|---|---|---|
| 5,143,949 | A * | 9/1992 | Grogan | ............... | C09D 5/008 427/154 |
| 5,342,872 | A * | 8/1994 | Huber | ............... | C09J 7/00 428/352 |
| 5,580,819 | A * | 12/1996 | Li | ............... | B32B 17/10018 427/162 |
| 6,174,977 | B1 * | 1/2001 | Ariyoshi | ............... | C08F 4/04 428/447 |
| 6,620,890 | B1 * | 9/2003 | Yamashita | ............ | C08F 265/04 523/201 |
| 2002/0035177 | A1 * | 3/2002 | Kishioka et al. | ............. | 524/157 |
| 2002/0071957 | A1 * | 6/2002 | Squitieri | ............... | B29C 73/02 428/442 |
| 2003/0065086 | A1 * | 4/2003 | Kosal | ............... | C08J 3/03 524/588 |
| 2003/0111159 | A1 * | 6/2003 | Hashimoto | ....... | B32B 17/10018 156/99 |
| 2004/0197586 | A1 * | 10/2004 | van Rossum | ........ | A01G 9/1438 428/500 |
| 2005/0281998 | A1 * | 12/2005 | Baker | ............... | B29C 70/50 428/292.1 |
| 2006/0079645 | A1 * | 4/2006 | Hasegawa | ............... | C08L 43/04 525/191 |
| 2007/0044514 | A1 * | 3/2007 | Naitou | ............. | B32B 17/10036 65/30.14 |
| 2010/0031810 | A1 * | 2/2010 | Neal | ............... | F41H 5/0407 89/36.02 |
| 2010/0167075 | A1 * | 7/2010 | Mesa | ............... | C09D 5/20 428/524 |

FOREIGN PATENT DOCUMENTS

EP           1719808        * 11/2006

OTHER PUBLICATIONS

ChemSpider Ethanol NPL document, retrieved Jul. 3, 2017.*
Acme-Hardesty Glycerin NPL document, retrieved Jul. 3, 2017.*
ChemicalBook Mineral Oil NPL document, retrieved Jul. 3, 2017.*
Fluorad NPL document, retrieved Jul. 3, 2017.*
Sigma-Aldrich NPL document, retrieved Jul. 3, 2017.*
PolymerProcessing NPL document, retrieved Jul. 3, 2017.*
Isopropyl alcohol NPL document retrieved Aug. 30, 2019.*
Foamaster MO NPL document retrieved Aug. 30, 2019.*
Bioplastics NPL document retrieved Aug. 30, 2019.*

* cited by examiner

*Primary Examiner* — Michael B Nelson
(74) *Attorney, Agent, or Firm* — Stroock & Stroock & Lavan LLP

(57) ABSTRACT

The present invention provides a composition for strengthening glass. The composition may incorporate one or more of a surfactant, a silane, and an adhesive resin. The composition may further incorporate one or more of a water-based solvent, a defoamer, a glycerol, and an alcohol. A strengthened glass laminate may be formed of a glass base and a coating made up of the glass strengthening composition. The strengthened glass laminate may further comprise a film. The coating may adhere the film to the glass. A method for making a strengthened glass laminate may include providing a glass base and spraying the glass strengthening composition on the glass base. The present composition has the combined advantages of both optical clarity, high adhesion to glass, and dimensional stability.

8 Claims, No Drawings

COMPOSITION FOR STRENGTHENING GLASS

CROSS-REFERENCE TO RELATED APPLICATION

This application is a U.S. national stage entry of International Application No. PCT/US2012/045936, filed on Jul. 9, 2012, which claims priority to and benefit of U.S. Provisional Application No. 61/505,860, filed on Jul. 8, 2011.

FIELD OF INVENTION

The present invention relates in general to strengthening glass, and more particularly to a composition for strengthening glass, the composition incorporating a surfactant, a silane, and an adhesive resin.

BACKGROUND OF INVENTION

The hazards of glass breakage in homes, businesses and automobiles can be caused by a number of factors. For example, vandalism, theft, hurricanes, tornadoes, windblown debris, bullets, and explosions, such as bomb blasts, petro-chemical accidents, and industrial accidents, can cause glass breakage. Flying glass resulting from the glass breakage can lead to human loss of life, as well as injury. Flying glass tends to cause upwards 80% of the casualties in bomb blasts from terrorism, such as the Alfred P. Murrah building in Oklahoma City, according to reports from the Department of Homeland Security.

Commercially available glass is made up of 4 basic types: soda lime, lead glass, borosilicate glass, and alumina silicate glass. Soda lime is the least costly, and most used commercially. Lead Glass is brilliant and tough. Borosilicate Glass has high heat and chemical resistance. Alumina Silicate Glass has the highest heat and chemical resistance of the four.

For most applications, soda-lime is the most commercially used and consequently has the greatest issues derived from flaws introduced into glass at the microscopic level. When glass is cooled, there appears on the surfaces of both sides in many cases, micro-fissures or micro-cracks or predisposed fault lines that inherently weaken glass. These micro-fissures/micro-cracks cause glass to break or fracture along these predisposed fault lines when external forces are applied, in the form of various types of impacts or impulse and/or overpressure.

A conventional solution for strengthening glass is to chemically temper the flat glass plate, for example with tri-potassium phosphate via introduction of the sodium-ion salts within the glass. This process can result in undesirable irregular coverage resulting in pitted glass surfaces.

Another chemical tempering method involves substituting potassium ions with sodium ions in the surface layer of the glass plate. This is accomplished by spraying an aqueous solution of potassium ions upon the glass at a temperature of between 200° C. and 500° C. A disadvantage of this method is that it limits the application and production processes only to manufacturing plants set up to handle the extremely high heat.

See also U.S. Pat. No. 4,218,230 [August 1980] by Patrick M. Hogan. See also: U.S. Pat. Nos. 3,218,220, 3,287,201, 3,607,172, 3,743,491, 3,791,809, 3,798,013, 3,844,754, 4,055,703, 4,133,665, 4,922,467, and GBX Patent No. 966,734.

However glass tempering does not solve the hazardous issues of glass shattering, sometimes catastrophically, which is known by those skilled in the art.

BRIEF DESCRIPTION OF INVENTION

The present invention is directed to a glass strengthening system and a glass strengthening formula for significantly enhancing glass strength. The strengthened glass is useful for applications in homes, commercial buildings and automotive Smash and Grab protection. The present invention provides an in-the-field glass strengthening system that combines both simplicity of application as well as a non-chemically processed solution to address the requirement of significantly decreasing glass fracturing and breakage.

According to some embodiments, a composition for strengthening glass, the composition comprises a silane, an adhesive, and a surfactant. The silane may comprise glycidoxypropyltrimethoxysilane. The adhesive may comprise an acetate monomer. The surfactant may comprise a nonionic fluorosurfactant. The composition may further comprise one or more of a water-based solvent, a defoamer, a glycerol, and an alcohol. The components may be used singly or in combination. For example, according to some embodiments, the composition comprises glycidoxypropyltrimethoxysilane; wherein the adhesive comprises an acetate monomer; wherein the surfactant comprises nonionic fluorosurfactant, and wherein the composition further comprising a defoamer, a glycerol, an alcohol, and a solvent comprising water.

According to some embodiments a strengthened glass laminate comprises a base comprising glass; and a coating disposed on the base, wherein the coating comprises a silane, an adhesive, and a surfactant. The silane may comprise glycidoxypropyltrimethoxysilane. The adhesive may comprise an acetate monomer. The surfactant may comprise a nonionic fluorosurfactant. The coating may further comprise one or more of a water-based solvent, a defoamer, a glycerol, and an alcohol. The components may be used singly or in combination. For example, according to some embodiments, the coating comprises glycidoxypropyltrimethoxysilane; wherein the adhesive comprises an acetate monomer; wherein the surfactant comprises nonionic fluorosurfactant, and wherein the composition further comprises a defoamer, a glycerol, an alcohol, and a solvent comprising water. The glass laminate may have at least about two fold increased strength as compared to the base. The glass laminate may further comprise a film layered over the coating.

According to some embodiments a process for making a strengthened glass laminate comprises providing a glass base; and spraying a composition on the glass base, wherein the composition comprises a silane, an adhesive, and a surfactant. The silane may comprise glycidoxypropyltrimethoxysilane. The adhesive may comprise an acetate monomer. The surfactant may comprise a nonionic fluorosurfactant. The composition may further comprise one or more of a water-based solvent, a defoamer, a glycerol, and an alcohol. The components may be used singly or in combination. For example, according to some embodiments, the composition comprises glycidoxypropyltrimethoxysilane; wherein the adhesive comprises an acetate monomer; wherein the surfactant comprises nonionic fluorosurfactant, and wherein the composition further comprises a defoamer, a glycerol, an alcohol, and a solvent comprising water.

The present composition has the combined advantages of both optical clarity, high adhesion to glass, and dimensional stability.

DETAILED DESCRIPTION OF THE INVENTION

The present chemical composition is herein termed GSS-11. GSS-11 is also termed herein ROK SHIELD GSS-11 is a water-based, non-hazardous, liquid compound. GSS-11 is a liquid glass application that, due to its numerous chemicals, performs several functions. GSS-11 further functions as an adhesion promoter. GSS-11 functions as a window glass strengthening liquid. GSS-11 fills in the micro-fissures within the glass surface.

GSS-11 may involve a solvent. The solvent may be a large amount of distilled $H_2O$ with no dissolved solids. The pH of the solvent may be about 7.0.

GSS-11 may combine a surfactant. The surfactant is advantageous for filling in the micro-fissures within the glass surface. The surfactant helps to better penetrate the small surface fissures. Surfactants in general are a combination of water hydrophilic as well as water insoluble hydrophobic components. Surfactants in general, reduce the surface tension of water. Surfactants in general reduce surface tension of water from 73 to 39 dynes per centimeter when used at a concentration of 0.005%. Exemplary surfactants for use in GSS-11 include but are not limited to, DOW ZONYL FSH or FSJ or other commercial surfactants. A GSS-11 formula may use a range of from about 1 ml to about 30 ml or even more, of surfactant per u.s. gallon (3.785 liter) of solvent. DOW Zonyl FSH is illustrative of nonionic fluorosurfactants.

GSS-11 may combine a small amount of isopropyl alcohol. The isopropyl alcohol is advantageous for increasing the drying process of GSS-11 sandwiched between a glass surface and a commercially available mylar and/or other petro-chemically derived window type films. The isopropyl alcohol helps make liquids such as water, in this case, wetter and more penetrative into the micro-fissures of the glass. The isopropyl alcohol may be provided as 91% to 99% isopropyl alcohol in water. A GSS-11 formula may use a range of from about 1 milliliter to about 30 milliliters of isopropyl alcohol per one u.s. gallon of solvent. Alternative alcohols are contemplated. Isopropyl alcohol is illustrative of alcohols.

GSS-11 may combine a defoamer. The defoamer may be made up of one or more commercial defoamers. An exemplary commercially available defoamer is New London C-2245. A defoamer for use with GSS-11 may be a water based, biodegradable, non-silicone blend. The defoamer is advantageous for preventing excessive foaming of the GSS-11 formula. The defoamer helps keep the sudsing effect low. A GSS-11 formula may use a range of from about 10 ml to about 50 ml defoamer per u.s._gallon of solvent.

GSS-11 may combine a glycerol. The glycerol is a nitrophenol glycerol type polyol compound. The glycerol may be synthetic or natural. The glycerol may be substantially pure. An exemplary commercially available glycerol is Acros Organics 99+% pure synthetic Glycerol.

The glycerol is highly soluble in water. The glycerol is advantageous as a preservative in this application. The glycerol also helps assimilate the various and somewhat disparate chemicals used in GSS-11. The glycerol has an affinity with all the combined formulae and has a hygroscopic property which allows it to draw moisture from the air. A GSS-11 formula may use a range of from about 0.01 ml to about 10 ml of glycerol per u.s._gallon of solvent.

GSS-11 may combine a silane. The silane may be a coupler. An exemplary silane is Glycidoxypropyltrimethoxysilane (also known as 3GLYMO). The silane functions as an adhesion promoter of acrylic adhesives. Acrylic adhesive may be found in one or more of the commercial window films and the GSS-11. A GSS-11 formula may use a range of between 1 ml to 20 ml of a silane per u.s. gallon of solvent.

GSS-11 may combines an adhesive. The adhesive may be an acetate monomer adhesive. The adhesive is water miscible or water soluable. The adhesive dries water clear, thus not affecting the overall clarity of the window glass/GSS-11/window film layering matrix. The adhesive is advantageous for providing an adhesion affinity between an acrylic adhesive found on the surface of a window film and the GSS-11. The acetate monomer adhesive serves as an adhesion promoter. A GSS-11 formula may use a range of from about 0.01 ml to about 10 ml acetate monomer adhesive per u.s. gallon of solvent. Acetate monomer adhesive is illustrative of an adhesive resin. An exemplary commercially available adhesive resin is Clifton Adhesives PS7195W.

Thus, GSS-11 may contain one or more component selected from the group consisting of a solvent, a surfactant, an alcohol, a defoamer, glycerol, a silane, an adhesive, and combinations thereof. For example, according to some embodiments, a composition for strengthening glass comprises a gallon of solvent; from about 1 to about 30 ml surfactant; from about 1 to about 30 ml alcohol; from about 10 to about 50 ml defoamer; from about 0.01 to about 10 ml glycerol; from about 1 to about 20 ml silane; and from about 0.01 ml to about 10 ml adhesive.

GSS-11 can be applied to all forms of glass. For example, GSS-11 can be applied to any one or more of: 1) Soda Lime; 2) Lead Glass; 3) Borosilicate Glass; and 4) Alumina Silicate Glass.

GSS-11 may be sandwiched between a glass surface and a commercially available mylar and/or other petro-chemically derived window type film.

The present system and process involve applying GSS-11 that is sprayed at ambient room temperature onto both the glass surface, as well as the adhesive side of a commercially available off the shelf mylar film. Exemplary commercially available mylar films are Madico Films, 3M Films, SolarGard, Global, Artscape, Solyx, and the like, such as foreign manufactured films.

The present chemical composition, system, and process go beyond the current chemically treated in-plant extreme high heat, application only solutions to glass breakage, by allowing on site applicators skilled in the art of applying window films, tinting films etc to apply the GSS-11 window strengthening solution combined with a commercially available window film onto existing clear or opaque glass type panes. The present system is also termed herein a strengthened glass laminate.

The present composition, system, and process are useful for producing strengthened glass that has advantages over regular glass. As previously discussed, glass is manufactured with predisposed fault lines that create paths or lines, for glass to break or fracture along. GSS-11 has the advantage of filling in those micro-cracks. The liquid chemicals in GSS-11 not only penetrate the glass surface at a microscopic level, but GSS-11 also causes the film adhesives to slowly be drawn into the glass micro-fractures, over a period of weeks depending on the ambient temperature of the environment. The glass strength may be dramatically increased. For example, the system may have strength improved at least about two fold as compared to untreated glass. More particularly, the system may have strength improved at least about four fold as compared to untreated glass.

It is noted here that there is created a bonding affinity between the acrylic adhesives in the film and the glass surface's penetrative functionality of the GSS-11 formula which increases the adhesion of the film to the glass surface through osmosis. This is done by the GSS-11 formula "drawing" or causing the film's adhesive to "creep" into the micro-fissures of the glass over a period of weeks depending on ambient temperature.

The present composition has the advantage of combining both optical clarity and high adhesion to glass, while producing a strengthened glass with dimensional stability.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLES

Example 1

This example illustrates a composition for strengthening glass.

A solvent, a surfactant, an alcohol, a defoamer, glycerol, a silane, and an adhesive, were mixed, as taught above, to form a composition where the solvent is water, the surfactant is DOW ZONYL FSH, the alcohol is isopropyl alcohol, the defoamer is New London C-2245, the glycerol is Acros Organics 99+% pure synthetic Glycerol, the silane is glycidoxypropyltrimethoxysilane, and the adhesive is Clifton Adhesives PS7185W.

Example 2

This example illustrates the glass strengthening properties of the composition of Example 1.

The composition of Example 1 was sprayed on a ¼ in glass base so as to coat the glass. An 8 ml Mylar film was adhered to the coated glass. These tests showed improved strength of the film/glass laminate as compared to the base glass.

Tests performed by commercial labs such as but not limited to Madico Films Labs have confirmed a dramatic increase in glass strength.

Bomb Blast testing was successfully completed according to GSA #2 requirements shows an advantage in life saving containment of flying glass. GSA #2, also known as GSA level 2, is a federal government standard.

Smash and Grab testing according to Madico Labs Testing shows an advantage over just glass alone by a significant degree.

Testing by Exova Labs showed results of break force % increase in glass breakage strength increase from 2.13 times to 3.43 times in psi break force when annealed glass was treated with ROK SHIELD Film of testing is available at www.youtube.com/playlist?list=PLA119B62544FE85E9. The film "ROK SHIELD 10" shows results for an annealed glass base and a film/glass laminate formed from the annealed base. 9.6 psi were required to crack the laminate, whereas the annealed glass base cracked under 4.5 psi.

Glass/ROK SHIELD [GSS-11] mylar film interface adhesion promoter increased pull off strength of films on glass by 2.2 times up to 3.5 times over soap and water used to apply mylar window films to glass. Curing times decreased from 30 days on average with soap and water to just 24 hours when ROK SHIELD was used in the application of films to glass.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is, therefore, contemplated that the claims will cover any such modifications or embodiments that fall within the true scope of the invention.

What is claimed is:

1. A strengthened glass laminate, prepared by a method comprising:
    providing a base comprising window glass having a glass surface to be treated, the glass surface having one or more micro-fissures or micro-cracks thereon; and
    applying a strengthening composition to the glass surface, the strengthening composition consisting of glycidoxypropyltrimethoxysilane, an adhesive consisting of acetate monomers, a nonionic fluorosurfactant, a water-based; non-silicone defoamer, glycerol, isopropyl alcohol, and water
    wherein the strengthening composition has optical clarity.

2. The strengthened glass laminate of claim 1, wherein the base comprises at least one of soda lime glass, lead glass, borosilicate glass, and alumina silicate glass.

3. The strengthened glass laminate of claim 1, wherein the strengthening composition is sprayed on the glass surface.

4. The strengthened glass laminate of claim 1, wherein the water is distilled water with no dissolved solids.

5. The strengthened glass laminate of claim 1, wherein the water has a pH of about 7.0.

6. The strengthened glass laminate of claim 1, wherein the strengthening composition is sprayed at room temperature onto both the glass surface and the adhesive side of the window film.

7. The strengthened glass laminate of claim 6, further comprising a window film having one or more acrylic adhesives on an adhesive side thereof, wherein the strengthening composition is sandwiched between the glass surface and the adhesive side of the window film.

8. The strengthened glass laminate of claim 6, wherein the window film is a petrochemical-derived window film.

* * * * *